United States Patent [19]
Rattmann et al.

[11] Patent Number: 5,976,003
[45] Date of Patent: Nov. 2, 1999

[54] UNITARY MEAT SLICES AND PROCESS

[75] Inventors: James A. Rattmann, Marshall; Jose C. Rojo; Jennifer Keller-Farwell, both of Madison, all of Wis.; Blake Gosnell, Sigourney, Iowa; Stephen C. Quickert, DeForest; Linda K. Finger, Madison, both of Wis.

[73] Assignee: Kraft Foods, Inc., Northfield, Ill.

[21] Appl. No.: 09/031,420

[22] Filed: Feb. 26, 1998

[51] Int. Cl.⁶ ........................................................ A22C 7/00
[52] U.S. Cl. .................................................. 452/39; 452/29
[58] Field of Search ................... 452/39, 29, 21, 452/37

[56] References Cited

U.S. PATENT DOCUMENTS

| | | |
|---|---|---|
| 1,874,453 | 8/1932 | Comer . |
| 3,480,449 | 11/1969 | Sumption . |
| 3,808,638 | 5/1974 | Kupcikevicius et al. . |
| 4,007,761 | 2/1977 | Beckman . |
| 4,028,775 | 6/1977 | Tysver . |
| 4,160,305 | 7/1979 | Tysver . |
| 4,466,463 | 8/1984 | Kupcikevicius . |
| 4,466,464 | 8/1984 | Kupcikevicius et al. . |
| 4,466,465 | 8/1984 | Frey . |
| 4,466,466 | 8/1984 | Raudys . |
| 4,466,984 | 8/1984 | Kupcikevicius . |
| 4,534,084 | 8/1985 | Stanley . |
| 4,562,617 | 1/1986 | Kollross ..................................... 452/39 |
| 4,641,687 | 2/1987 | Kupcikevicius . |
| 5,003,666 | 4/1991 | Stall et al. . |
| 5,027,863 | 7/1991 | Kupcikevicius . |
| 5,273,482 | 12/1993 | Beckman et al. . |
| 5,277,648 | 1/1994 | Beckman et al. . |
| 5,431,598 | 7/1995 | Beckman et al. . |
| 5,468,179 | 11/1995 | Stanley et al. ............................ 452/37 |

*Primary Examiner*—Willis Little
*Attorney, Agent, or Firm*—Lockwood, Alex, Fitzgibbon & Cummings

[57] ABSTRACT

Whole muscle slicing is accomplished in order to provide a plurality of meat slices, each of which is a single piece of meat, despite the fact that the muscle from which the slices originate had been reshaped prior to slicing in order to enhance slicing yield from each such muscle. The invention is particularly useful in forming roast beef slices which are used in preparing weight-controlled food products such as sandwiches.

20 Claims, 3 Drawing Sheets

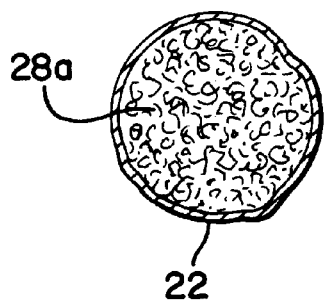
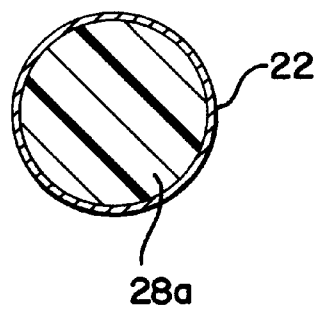
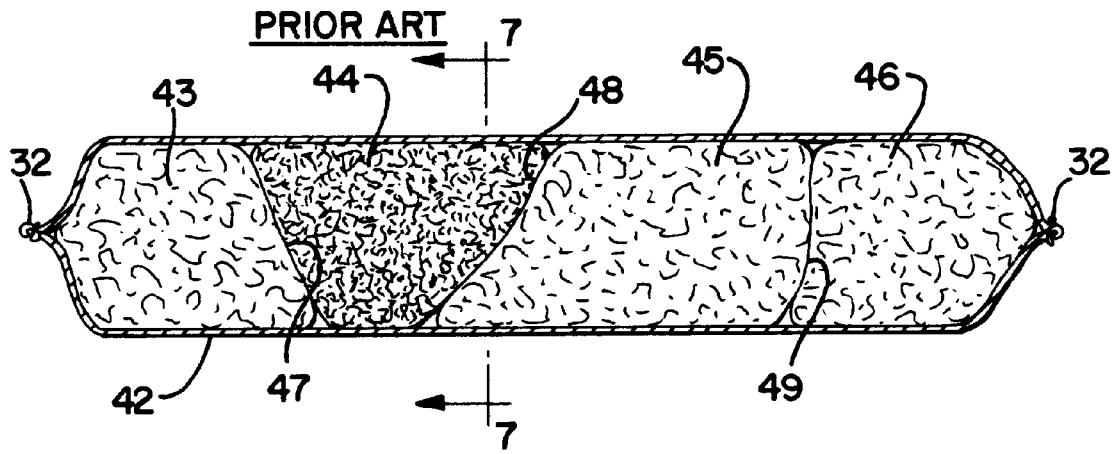
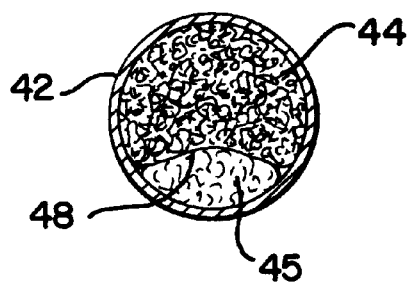

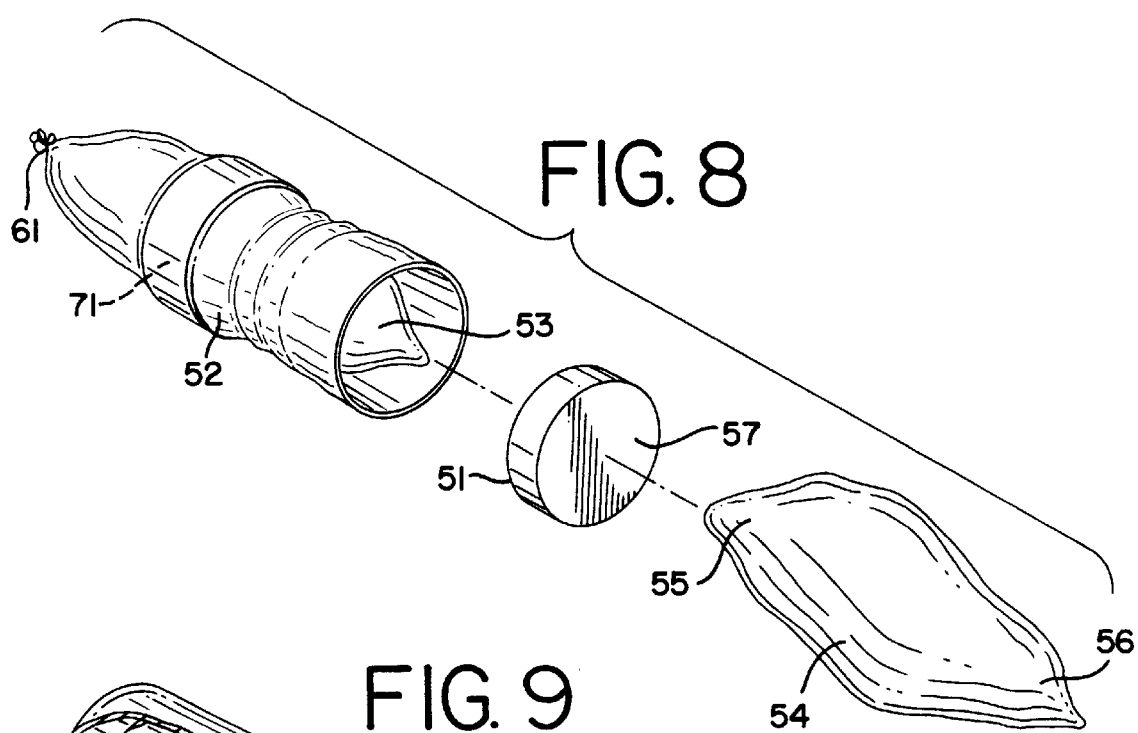
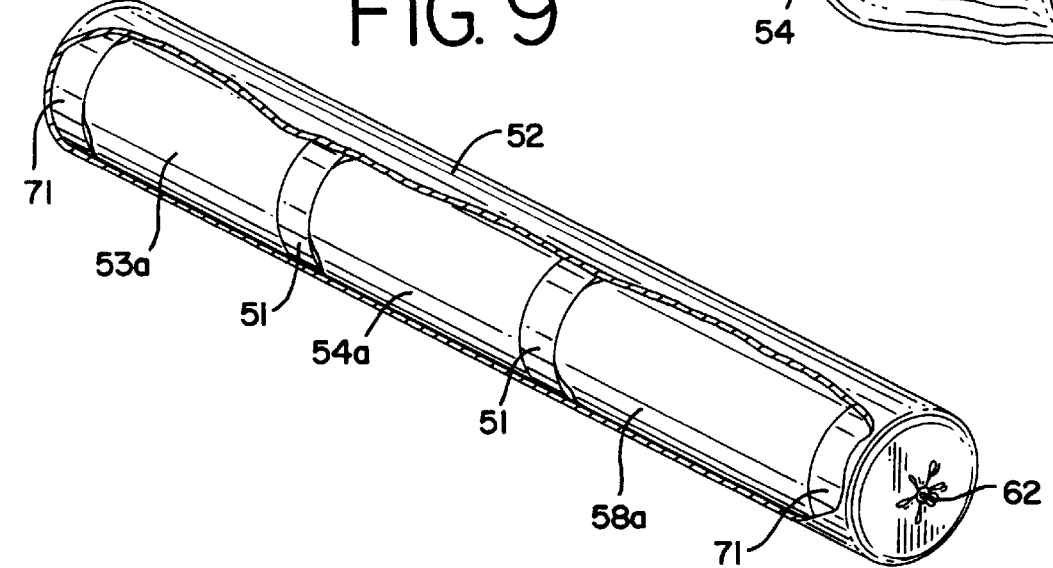

UNITARY MEAT SLICES AND PROCESS

BACKGROUND OF THE INVENTION

This invention generally relates to slicing of meat products, more particularly to meat product slicing which eliminates slices formed from more than one meat muscle cut or piece. Prior to slicing, the whole meat muscle cut or piece is somewhat reshaped, particularly its longitudinal end portions, by engaging same with a spacer when the meat and spacer are within a casing which is then longitudinally tensioned.

Casings are of course well known for their usefulness in producing meat products of various types. It is also generally appreciated that casings are useful in shaping meats. Included in this regard are shaping smaller meat pieces, including ground meat, within casings in order to form products which are traditionally recognized as sausages, luncheon meats, restructured meat products, and the like. Patents such as U.S. Pat. No. 3,480,449 and U.S. Pat. No. 5,003,666 incorporate the use of discs at the longitudinal ends of casings otherwise filled with ground meat, multiple meat pieces and meat batters. Discs of this type are said to provide flattened sausage ends. In some channels of trade, such flattened ends can be considered to be aesthetically more pleasing than a dome-shaped end.

Also generally known is the use of casings in preparing so-called chunk sectioned and formed meat products. Illustrative in this regard is U.S. Pat. No. 4,534,084. In some instances, casings are used in procedures for joining together two or more larger muscle pieces or chunks. In such approaches, the casing surrounding the meat is stretched and clipped to close same around the meat, thereby compressing the meat and adhering the meat pieces together at the interfaces between them.

In approaches such as these, it is also known to cook the meat when thus stuffed into the casings, and allow the meat to cool and set. The result is the formation of a relatively solid assembled meat product which remains assembled and which generally retains the shape imparted to it as a result of the casing stretching and cooking. Such approaches also include traditional treatments which are known to those skilled in the art, such as chilling and the like. It is also heretofore known that the thus-assembled shaped meat product can be sliced as desired. Often, this slicing is carried out after the casing is removed and typically discarded. These types of approaches are often geared toward providing stacks of sliced meat products. These meat product slices may be of uniform slice thickness, with each slice having a target weight. Alternatively, slicing technology is available for forming slices of uniform weight.

In certain applications, sliced meat products which have a restructured constitution are perceived as being of lower quality and thus less desirable, when compared with slices made from whole muscle cuts or large pieces of meat. Meats which have been restructured or assembled can be perceived as less desirable when, by casual observation, it is evident that the meat piece or slice had been made from more than a single muscle piece. These types of observations are especially easily made when the meat is a beef product. Meat cuts such as those traditionally identified as roast beef vary considerably from piece to piece in terms of color, texture, grain orientation and overall appearance. Accordingly, when a slice of roast beef is cut from an assembled meat product, that slice can vary in appearance from slices made from other roast beef products. In general, this is expected and usually therefore easily accepted (if not welcomed) by the consumer. However, this divergence in appearance is often viewed negatively by the consumer when this variety in appearance occurs in the same slice. For example, such a slice could have a significant portion which is of a reddish color and another significant portion which is of a grayish color, thereby strongly indicating a line of demarcation which evidences a product which is restructured and had been assembled from more than one muscle piece.

An important reason for reshaping products such as large cuts of meat muscle is to enhance the efficiency of slicing and of slice distribution. Most naturally occurring or traditionally butchered meat cuts are not of a uniform shape. Although some such cuts can be considered to be generally longitudinal in shape, and thus often more conveniently sliced, even these types of cuts of muscle have longitudinal end portions which are not uniformly shaped or sized. Virtually every naturally occurring or traditionally butchered meat muscle piece does not have a uniform size and shape throughout its longitudinal extent. Without reshaping, certain slices (often those at the longitudinal ends) will be difficult to slice, thereby leaving low-value butt ends. Alternatively, if slicing of these portions of meat pieces is carried out, the resulting slices are often less than satisfactory, such as being significantly underweight or of too small a perimeter in order to satisfy demanding expectations and tastes of consumers. Accordingly, there is often a desire to proceed with some reshaping so as to substantially increase slicing yield for a given cut or piece of meat muscle, such as one traditionally used in preparing whole roast beef slices.

It would accordingly be desirable to achieve the slicing yield benefits and handling efficiency benefits which can be realized by proceeding with some type of reshaping procedure. At the same time, it would be desirable to achieve this important commercial result without encountering the perceived disadvantageous result of providing slices which have a structure originating from more than a single meat muscle cut or piece. It would also be advantageous if these important results could be obtained without requiring specially designed and manufactured equipment.

SUMMARY OF THE INVENTION

In accordance with the present invention, whole meat muscles are manipulated by the operation, upon a meat muscle, of a casing and one or more spacers. Often, multiple meat muscles are so manipulated, and this is accomplished without joining the meat muscles together. Each resulting reshaped muscle cut is of enhanced value in that it is more readily sliced into slices of more uniform size and weight. The spacer is substantially rigid and has generally flat faces for engaging meat muscle. When the thus organized meat muscle and spacer are subjected to longitudinal tensioning by a casing positioned thereover, the desired reshaping is carried out without joining one muscle cut to another.

It is accordingly a general object of the present invention to provide an improved process for reshaping and slicing meat muscle chunks.

Another object of the present invention is to provide an improved process for reshaping a plurality of whole muscle pieces in one assembly without assembling any of the muscle pieces together.

Another object of this invention is to provide an improved shaping and slicing process and slices produced thereby, each of which is from a single, unassembled whole muscle piece, while the slices are substantially more uniform in perimeter size than if slices were cut from the same meat muscle piece which had not been reshaped in accordance with the invention.

Another object of the present invention is to provide enhanced slicing yield without negatively impacting the perceived quality of each slice.

These and other objects, features and advantages of the present invention will be apparent from and clearly understood through a consideration of the following detailed description.

BRIEF DESCRIPTION OF THE DRAWINGS

In the course of this description, reference will be made to the attached drawings, wherein:

FIG. 4 is a cross-sectional view taken along the line 4—4 of FIG. 3;

FIG. 5 is a cross-sectional view taken along the line 5—5 of FIG. 3;

FIG. 6 is longitudinal sectional view illustrating a prior art approach which is improved upon by the present invention;

FIG. 7 is a cross-sectional view taken along the line 7—7 of FIG. 6;

FIG. 8 is an exploded perspective view of an alternate embodiment, shown with the casing component cut away;

FIG. 9 is a perspective, cut-away view of the embodiment as shown in FIG. 8 in its assembled and tensioned condition; and FIG. 10 is a longitudinal cross-sectional view of the embodiment illustrated in FIG. 9.

DESCRIPTION OF THE PREFERRED EMBODIMENTS

Figure 1:
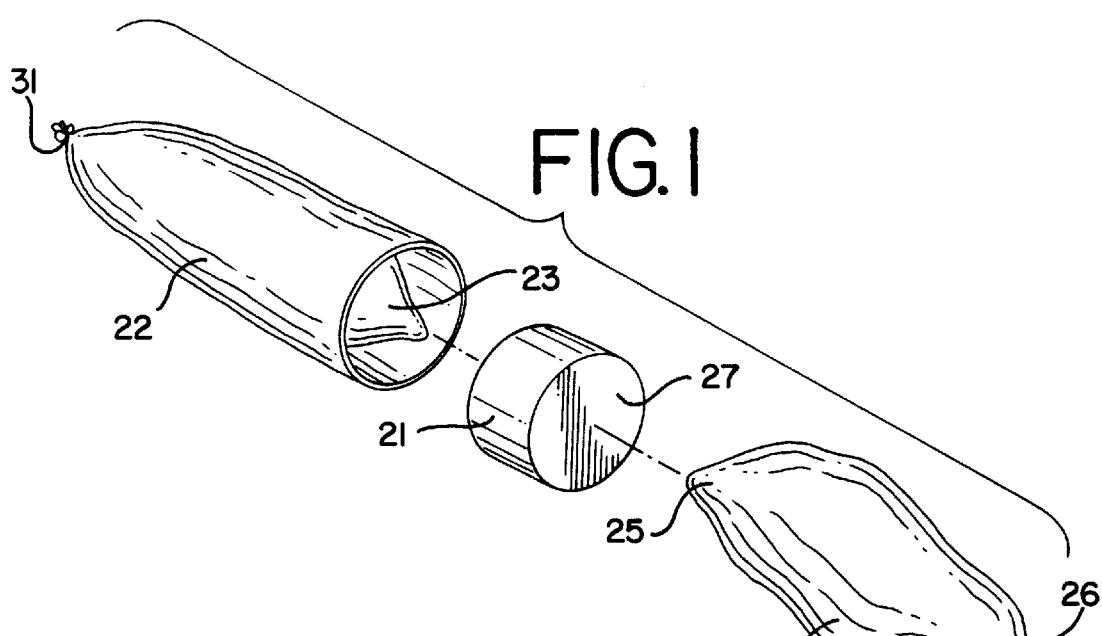
FIG. 1 is an exploded perspective view of a preferred embodiment of the present invention, shown with the casing component partially broken away.

FIG. 1 illustrates components according to the invention during the process of their assembly according to the invention. A spacer 21 is shown in the process of being positioned into a casing 22. Already shown positioned within the casing is a whole meat muscle cut 23. A second whole meat muscle cut 24 is shown oriented for positioning within the casing. Each meat muscle cut includes a leading end 25 and a trailing end 26.

With more particular reference to each whole meat muscle cut, this term encompasses a unitary piece of meat muscle. A preferred unitary meat muscle cut is a unitary piece of meat which is of a traditionally butchered type and/or may be considered as a naturally delineated and available cut or piece. In those instances where the meat muscle cut might be less than what is traditionally considered to be a full-sized muscle piece, the term meat muscle cut can encompass severed portions of traditional cuts. In any event, the meat muscle cut 23, 24 is a unitary piece of meat muscle.

The important aspects of the present invention are more advantageously applied to meat muscle cuts which are of the bovine variety. So-called roast beef cuts are the preferred meat muscle cuts. Porcine meat sources can also be the focus of the present invention. Generally, pork and ham products are not as diverse in coloration, texture, grain orientation and overall appearance as are beef cuts. Accordingly, they are less in need of the present invention. Poultry sources are typically even less in need of practices in accordance with the present invention, although poultry muscle cuts are also susceptible to being processed according to the present invention.

It will be noted that each illustrated spacer 21 has opposing faces which are generally flat. Illustrative in this regard is spacer face 27. Most casings are circular or generally circular in cross-section, such as casing 22 illustrated in the drawings. Each spacer 21 will typically have a profile or perimeter in transverse cross-section which is likewise circular or generally circular so as to substantially conform in shape to the cross-sectional profile of the particular casing being used. Preferably, each spacer is a right cylinder. Typically, the perimeter size of each spacer 21 will be noticeably less than that of the casing 22. This smaller size is to reduce the chance that the spacer will interfere with the longitudinal tensioning and compressing described elsewhere herein, which action is best accomplished when the spacer does not interfere with diameter reduction of the casing which occurs when it is stretched.

Preferred spacers used for making products such as sliced roast beef have a diameter on the order of about 4 inches (about 18 to 19 cm). It can be important for facilitating the assembly procedure practiced according to the invention that the spacer have a substantial length. A spacer which is relatively short in the longitudinal or axial direction has a tendency to be difficult to align when it is being properly positioned within the casing. Spacers which are too thin in this regard, such as to be more in the nature of a lid or button, easily become misaligned so that their axes are not substantially coincident with the longitudinal axis of the casing. They often will fall over or become skewed, especially when encountering meat muscle cuts having a leading or trailing end which is particularly lacking in natural flatness, such as the illustrated, somewhat conical ends 25 and 26 which are illustrated in FIG. 1, for example. For spacers having a diameter on the order of about 4 inches, the axial or longitudinal length of the spacer should be at least 1.5 inches (about 4 cm), preferably at least 2 inches (about 5 cm), and more preferably at least about 2.5 inches (about 6.5 cm). A particularly preferred spacer has a diameter of 4.125 inches (about 10.5 cm) and an axial length of about 3 inches (about 7.6 cm).

Spacer 21 should be made of a material that is inert, easily cleaned and thus sanitary, relatively light in weight, rugged, and able to withstand the cooking temperatures and conditions practiced according to the invention, as well as the harsh cleaning conditions to which food-contacting equipment must be subjected. Usually polymers are more suitable than metals, primarily due to the relatively heavier weight of metals which satisfy the other criteria for the spacer. Exemplary polymers include acetyl copolymers such as CELCON®, acetyl homopolymers such as DELRYN® and polyolefins, particularly the tougher or higher density ones. Acetyl copolymers have been found to be particularly suitable.

With more particular reference to the embodiment illustrated in FIG. 1, each unitary muscle cut 23 is typically subjected to known treatment approaches in order to enhance the flexibility and reduce the elasticity of the unitary muscle cut. Typical practices in this regard include maceration, injection with brines, pickles and the like, and tumbling. An initial unitary muscle cut 23 is inserted toward one end of the casing, the leading end of the cut being oriented generally to the left as shown in FIG. 1. In this instance, one end of the casing is already clipped or tied by suitable known means at gathered end 31. Next, a spacer 21 is inserted into the casing such that its leading face is positioned for contacting the trailing end of the unitary muscle cut 23. Next, another meat muscle cut 24 is inserted into the casing such that its leading end 25 is positioned for engagement with the trailing spacer face 27. Additional spacers and meat muscle cuts can be added as desired, although no more spacers or muscle cuts need be added into the casing.

Figure 2:
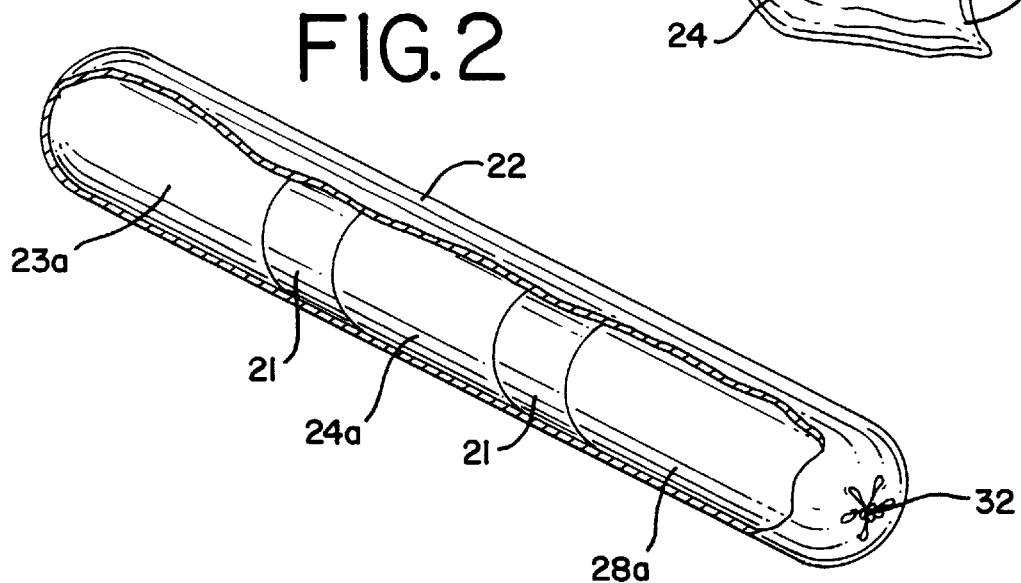
FIG. 2 is a perspective, cut-away view of the embodiment of FIG. 1 shown after assembly and tensioning.
Figure 3:
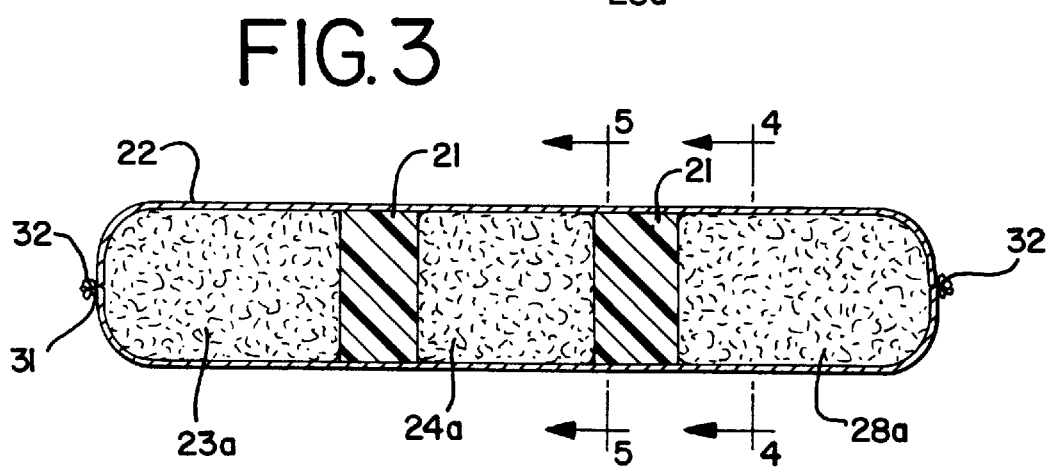
FIG. 3 is a longitudinal cross-sectional view of the embodiment as shown in FIG. 2.

In the illustrated embodiment as shown in FIG. 2 and FIG. 3, a second spacer 21 is shown for engagement with the trailing end 26 of the unitary meat muscle cut 24. A third meat muscle cut is then positioned for engagement with the trailing face of this additional spacer. Generally, the number of muscle cuts will be determined by the needs of the meat processor and the casing stuffing and stretching equipment which is available, especially the casing lengths which are accommodated by the equipment.

Whatever the number of unitary meat muscle cuts and spacers which are incorporated, the assembly can be facilitated by the use of a commercial stuffing machine. Suitable machines in this regard include those available from AFECO, of Algona, Iowa. The stuffed casing is then stretched and tied off or clipped. It is suitable to use commercial equipment to accomplish these functions, such as equipment available from Tipper Tie, of Apex, North Carolina. With this type of equipment, the casing is stretched tightly so as to impart inwardly directed, longitudinally aligned forces, as well as generally inwardly directed radial forces, in order to thereby tension the casing and cause longitudinal compression and radial compression of the muscle cuts. Once the proper tensioning has been applied, clip 32 is secured in place (as is a clip at gathered end 31, if such had not already been secured in place). The result is the formation of reshaped unitary meat muscle cuts such as those illustrated at 23a, 24a, 28a. Such reshaped meat muscle cuts are formed by compression, especially as applied between the closed casing ends and the opposing faces of the spacer or spacers 21.

This assembly of casing, reshaped meat muscle cuts and spacer(s) is then subjected to typical processing conditions. For example, beef products are typically subjected to cooking in accordance with conditions generally known in the art. A typical assembly may be about 40 inches (about one meter) long. Such cooking of the meat when in the reshaped condition, in conjunction with typical pre-stuffing treatments as discussed herein, renders the reshaped unitary meat muscle cut more solid and more readily sliceable. After any subsequent treatment procedures which may be desired, such as chilling, spraying, and the like, the casing 22 is removed in accordance with generally known approaches. The spacers are cleaned and recycled for future use, while the reshaped unitary meat muscle cuts are transported to a slicing operation.

Slicing is carried out on generally known equipment. With the present invention, relatively unsophisticated slicing of each slice to a chosen thickness is typically all that is required. Slices of uniform thickness are as generally depicted in FIG. 4, with the casing having been previously removed. Although each slice does not necessarily have a true circular perimeter, and although slicer perimeter shapes can vary somewhat due to natural non-uniform shapes (see FIG. 4), most slices thus prepared from the reshaped muscle cuts will be of about the same perimeter size. Perimeter sizes will be somewhat smaller at the extreme ends of the assembly when the assembly does not incorporate a spacer at the far end, which is the situation illustrated in FIG. 2 and FIG. 3. It will be appreciated that each such slice will be from a single meat muscle cut, even those at the extreme longitudinal edges of each and every reshaped muscle product.

In comparison, prior art approaches such as those illustrated in FIG. 6 and FIG. 7 do not always produce slices originating from a single meat muscle cut. With this prior art approach, no spacers are included. Instead, each unitary meat muscle cut 43, 44, 45, 46 has been adhered to one or more adjoining such unitary meat muscle cuts. Due to the naturally uneven and non-flat shape of the muscle cuts, adherence interfaces are formed between the cuts during stuffing, stretching and clipping operations generally along the lines of those generally discussed herein in accordance with the invention. After the casing 42 is removed, the composite meat product as shown in FIG. 6 is ready for slicing.

When the center portion of any of the unitary meat muscle cuts 43, 44, 45, 46 is sliced, a unitary slice is formed. When the slicing is through any portion of the interfaces 47, 48, 49, the slice will consist of parts from two different muscle cuts. In the illustration of FIG. 7, the generally illustrated slice includes portions from meat muscle cut 44 and meat muscle cut 45. Most notably, the adherence interface 48 is readily apparent. The ease with which the adherence interface can be discerned is magnified by the difference in texture and coloration between muscle cut 44 and muscle cut 45 in this illustration.

In addition, with such a prior art approach, these slices originating from two or more different muscle cuts have a tendency to separate. More specifically, because the forces adhering the muscles together are relatively weak, such slices may separate along the adherence interface as they are individually removed from a stack of slices, especially when those slices have been vacuum packaged. This is another undesirable attribute of slices formed from multiple muscle cuts.

With reference to the alternate embodiment illustrated in FIG. 8, FIG. 9 and FIG. 10, a primary difference between this embodiment and the embodiment of FIG. 1 through FIG. 5 is the inclusion of end spacers 71. A step in the assembly according to this embodiment includes inserting end spacer 71 into the casing 52, as generally shown in FIG. 8. Unitary meat muscle cut 53 is positioned at the trailing or inside end face of the end spacer 71. The rest of the assembly is as previously described. A spacer 51 is positioned between cut 53 and unitary meat muscle cut 54, with its face 57 being oriented for engagement with the leading end 55 of the cut 54. Another spacer 51 is shown for engagement with the trailing end 56 of the cut 54. Another end spacer 71 is positioned into place, and the casing is stretched and clipped as previously discussed. The resulting reshaped unitary meat muscle cuts 53a, 54a, 58a each have two flattened ends, as is particularly evident from FIG. 10. This approach will result in minimizing slices which have a periphery noticeably smaller than that of the remainder of the slices, including center slices, from any given reshaped unitary meat muscle cut.

A typical meat muscle cut processed according to the invention will have a weight of between approximately 10 pounds and 20 pounds (between approximately 4.5 kg and 9 kg). A typical slice weight is between about 0.5 ounce and about 1 ounce (between about 14 grams and about 28 grams), such as about ⅔ ounce (about 19 grams). A typical slice thickness is between about 0.04 inch and about 0.05 inch (between about 1.0 mm and about 1.3 mm). With the generally uniform slice preparation in accordance with the invention, excellent portion control and weight control objectives are readily achievable.

It will be understood that the embodiments of the present invention which have been described are illustrative of some of the applications of the principles of the present invention. Numerous modifications may be made by those skilled in the art without departing from the true spirit and scope of the invention.

We claim:

1. A process for reshaping and slicing unitary meat muscle cuts, comprising the steps of:

providing a casing for meat products, the casing having a first end and a second end;

inserting a unitary meat muscle cut into the casing such that the unitary meat muscle cut is substantially longitudinally oriented within the casing in order to thereby define a leading end and a trailing end of the muscle cut;

providing a substantially rigid spacer which has oppositely directed generally flat faces which are generally perpendicular to the longitudinal axis of the spacer;

placing the substantially rigid spacer into the casing so that one of the generally flat faces thereof opposes the trailing end of the unitary meat muscle cut;

inserting another unitary meat muscle cut into the casing so that a leading end thereof opposes the other of the generally flat faces of the substantially rigid spacer;

closing the first and second ends of the casing to provide a closed casing;

tensioning the closed casing to thereby compress the unitary meat muscle cuts between the closed casing ends and the spacer thereby substantially flattening the leading end and the trailing end of each unitary meat muscle cut to provide reshaped unitary meat muscle cuts; and removing the casing and slicing the reshaped unitary meat muscle cuts.

2. The process in accordance with claim 1, wherein said tensioning of the closed casing includes longitudinally stretching the closed casing, thereby imparting inwardly directed longitudinal forces and inwardly directed radial forces onto the unitary meat muscle cuts.

3. The process in accordance with claim 1, wherein said slicing of each reshaped unitary meat muscle cut forms meat slices, each one of which is a unitary, non-assembled slice.

4. The process in accordance with claim 1, further including macerating and tumbling the unitary meat muscle cut prior to said inserting steps.

5. The process in accordance with claim 1, wherein at least one of said inserting steps inserts a unitary meat muscle cut of between about 10 pounds and about 20 pounds (about 4.5 kilograms and about 9 kilograms).

6. The process in accordance with claim 1, further including positioning another substantially rigid spacer into the casing prior to the first inserting step so that this spacer is positioned for engagement with the leading end of the unitary meat muscle cut of this first inserting step.

7. The process in accordance with claim 1, further including positioning a further spacer into the casing prior to said closing step in order that one face of this further spacer engages a trailing end of the another unitary meat muscle cut.

8. The process in accordance with claim 1, further including positioning another substantially rigid spacer into the casing prior to the first inserting step so that this spacer is positioned for engagement with the leading end of the unitary meat muscle cut of this first inserting step; and further including positioning a further spacer into the casing prior to said closing step in order that one face of this further spacer engages a trailing end of the another unitary meat muscle cut.

9. A process for reshaping and slicing unitary cuts of beef muscle, comprising the steps of:

providing a casing for meat products, the casing having a first end and a second end;

inserting a unitary cut of beef muscle into the casing, the unitary cut of beef muscle being substantially longitudinally oriented within the casing in order to thereby define a leading muscle end and a trailing muscle end;

providing a right-cylindrically shaped substantially rigid spacer which has oppositely directed flat faces perpendicular to the axis of the cylindrical spacer;

placing the right-cylindrically shaped substantially rigid spacer into the casing so that one of the generally flat faces thereof engages the trailing end of the unitary muscle which is within the casing;

inserting another unitary cut of beef muscle into the casing so that a leading end thereof engages the other of the generally flat faces of the right-cylindrically shaped substantially rigid spacer;

closing the first and second ends of the casing to provide a closed casing, and longitudinally stretching the closed casing to thereby compress the unitary cuts of beef muscle in a longitudinal direction between the closed casing ends and the spacer until the ends of the unitary cuts of beef muscle which are in engagement with the spacer are substantially flattened, while the opposing ends of each unitary cuts of beef muscle are reshaped to conform to the respective closed casing ends in order to thereby provide reshaped unitary cuts of beef muscle; and removing the casing and slicing each reshaped unitary cut of beef muscle into a plurality of single-piece slices, each of which originated entirely from a single unitary cut of beef muscle.

10. The beef reshaping and slicing process in accordance with claim 9, further including macerating and tumbling the unitary cuts of beef muscle prior to said inserting steps.

11. The beef reshaping and slicing process according to claim 9, wherein at least one of said inserting steps inserts a unitary cut of beef muscle of between about 10 pounds and about 20 pounds (about 4.5 kilograms and about 9 kilograms).

12. The beef reshaping and slicing process of claim 9, further including positioning another substantially rigid spacer into the casing prior to the first inserting step so that this spacer is positioned for engagement with the leading end of the unitary cut of beef muscle of this first inserting step; and further including positioning a further spacer into the casing prior to said closing step in order that one face of this further spacer engages a trailing end of the another unitary cut of beef muscle.

13. A plurality of meat slices made by a process which includes reshaping and slicing unitary meat muscle cuts comprising the steps of:

providing a casing for meat products, the casing having a first end and a second end;

inserting a unitary meat muscle cut into the casing such that the unitary meat muscle cut is substantially longitudinally oriented within the casing in order to thereby define a leading end and a trailing end of the muscle cut;

providing a substantially rigid spacer which has oppositely directed generally flat faces which are generally perpendicular to the longitudinal axis of the spacer;

placing the substantially rigid spacer into the casing so that one of the generally flat faces thereof opposes the trailing end of the unitary meat muscle cut;

inserting another unitary meat muscle cut into the casing so that a leading end thereof opposes the other of the generally flat faces of the substantially rigid spacer;

closing the first and second ends of the casing to provide a closed casing;

tensioning the closed casing to thereby compress the unitary meat muscle cuts between the closed casing ends and the spacer thereby substantially flattening the leading end and the trailing end of each unitary meat muscle cut to provide reshaped unitary meat muscle cuts; and removing the casing and slicing the reshaped unitary meat muscle cuts into a plurality of meat slices.

14. The meat slices in accordance with claim 13, wherein each one of said plurality of meat slices is a unitary, single-piece non-assembled slice.

15. The meat slices in accordance with claim 13, wherein each unitary meat muscle cut had been macerated and tumbled.

16. The meat slices in accordance with claim 13, wherein at least one of said unitary meat muscle cuts weighs between about 10 pounds and about 20 pounds (about 4.5 kilograms and about 9 kilograms).

17. The meat slices in accordance with claim 14, wherein each unitary slice is a thickness between about 0.040 inch and about 0.050 inch (between about 1.0 mm and about 1.3 mm).

18. The meat slices in accordance with claim 14, wherein each unitary slice weighs between about 0.5 ounce and about 1 ounce (between about 14 grams and about 28 grams).

19. The meat slices in accordance with claim 14, wherein the meat is beef.

20. The meat slices in accordance with claim 13, wherein the process further includes positioning another substantially rigid spacer into the casing prior to the first inserting step so that this spacer is positioned for engagement with the leading end of the unitary meat muscle cut of this first inserting step; and positioning a further spacer into the casing prior to said closing step in order that one face of this further spacer engages a trailing end of the another unitary meat muscle cut.

* * * * *